UNITED STATES PATENT OFFICE.

JACOB HOLTON AND MARY J. HOLTON, OF MAHASKA COUNTY, IOWA.

IMPROVEMENT IN COMPOUNDS FOR THE CURE OF CHOLERA IN HOGS, &c.

Specification forming part of Letters Patent No. 126,961, dated May 21, 1872.

Specification describing a certain Compound, invented by JACOB HOLTON and MARY J. HOLTON, in the county of Mahaska and State of Iowa.

The nature of the invention of the said JACOB HOLTON and MARY J. HOLTON consists in mixing Glauber salts, one-half table-spoonful, or one table-spoonful of Epsom salts, with one-half pint of water, (lukewarm,) and one hen's egg with half pint of sweet milk, (lukewarm.) Mix all together to make the compound.

To prepare the above ingredients to make the compound, dissolve the salts in the half pint of lukewarm water; then beat the egg and mix it with the half pint of sweet milk, (lukewarm;) then put the solutions together into a vessel, and mix well; this then makes the compound fit for use.

This is the proportion or dose for one hog to cure the disease in hogs, as hog cholera and its concomitant fever: Give the hog twice a day for several days, and do not permit the hog to drink cold water until the compound has acted.

We claim—

The invention of the compound, substantially in the proportions and for the purposes set forth.

JACOB HOLTON.
MARY J. HOLTON.

Witnesses:
TOBIAS B. KINDIG,
WARREN HOLTON.